United States Patent
Kim

(10) Patent No.: US 7,257,242 B2
(45) Date of Patent: Aug. 14, 2007

(54) APPARATUS FOR CONTROLLING TEMPERATURE OF FINGERPRINT SENSOR FOR VEHICLE AND METHOD THEREOF

(75) Inventor: Sang Min Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 791 days.

(21) Appl. No.: 10/696,640

(22) Filed: Oct. 28, 2003

(65) Prior Publication Data

US 2004/0247162 A1    Dec. 9, 2004

(30) Foreign Application Priority Data

Jun. 5, 2003    (KR) .................... 10-2003-0036384

(51) Int. Cl.
*G06K 9/00*    (2006.01)
(52) U.S. Cl. .................... 382/125; 382/124
(58) Field of Classification Search ........ 382/115–116, 382/124–127
See application file for complete search history.

(56) References Cited

U.S. PATENT DOCUMENTS

| 4,358,677 | A | * | 11/1982 | Ruell et al. ............... 250/216 |
| 5,601,079 | A | | 2/1997 | Wong et al. |
| 5,825,474 | A | * | 10/1998 | Maase ........................ 356/71 |
| 6,809,303 | B2 | * | 10/2004 | Carver et al. ............... 219/543 |
| 6,872,916 | B2 | * | 3/2005 | Carver et al. ............... 219/201 |
| 6,960,790 | B2 | * | 11/2005 | Miyai et al. ................ 257/77 |
| 2003/0012417 | A1 | * | 1/2003 | Hamid ........................ 382/124 |
| 2003/0089703 | A1 | | 5/2003 | Carver et al. |

FOREIGN PATENT DOCUMENTS

JP    2001-312590    10/2001

* cited by examiner

*Primary Examiner*—Vikkram Bali
(74) *Attorney, Agent, or Firm*—Morgan Lewis & Bockius LLP

(57) ABSTRACT

When a fingerprint sensor temperature is outside a preferred predetermined temperature range, heat is transferred between a fingerprint sensor and semiconductor assembly. Accordingly the fingerprint sensor temperature can stay within the predetermined temperature range regardless of the driving conditions.

14 Claims, 2 Drawing Sheets

APPARATUS FOR CONTROLLING TEMPERATURE OF FINGERPRINT SENSOR FOR VEHICLE AND METHOD THEREOF

CROSS-REFERENCE TO RELATED APPLICATIONS

This application claims priority of Korean Application No. 10-2003-0036384, filed on Jun. 5, 2003, the disclosure of which is incorporated fully herein by reference.

FIELD OF THE INVENTION

Generally, the present invention relates to an apparatus for controlling a fingerprint sensor temperature for a vehicle, and a method thereof. More particularly, the present invention relates to an apparatus and method for controlling a fingerprint sensor temperature utilizing a thermoelectric semiconductor.

BACKGROUND OF THE INVENTION

A biometric sensor, a fingerprint sensor to be specific, is a fingerprint image capture device. The fingerprint sensor captures fingerprint images, matches the uniqueness of each print read by the sensor, and compares it to those stored in its module or local system database. Types of fingerprint sensors include static capacitive, dynamic capacitive, optic reflexive, and thermal line sensors, and all the fingerprint sensor types are generally known as optical sensors or semiconductor sensors. Of the various sensor types, considering vehicle vibration, optical sensors cannot be mounted on a vehicle.

Furthermore, the working temperature of semiconductor sensors is limited to within a predetermined range for stability and reliability of recognition, so it is required to control the semiconductor sensor temperature to within the predetermined range.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

An exemplary apparatus for controlling fingerprint sensor temperature comprises a power source, a temperature sensor for detecting a fingerprint sensor temperature, a thermoelectric semiconductor assembly interposed between the fingerprint sensor and the power source for cooling or heating the fingerprint sensor according to a direction of a current from the power source to the thermoelectric semiconductor assembly, and a controller controlling the power source based on the fingerprint sensor temperature.

In a further embodiment, the thermoelectric semiconductor assembly comprises an n-type semiconductor, a p-type semiconductor, an electrode for conjunction between the n-type semiconductor and the p-type semiconductor, two counter electrodes respectively connected to the power source, and an intermediate element for heat transfer between the conjunction electrode and the fingerprint sensor.

Preferably, the intermediate element is formed with silicon.

In another embodiment, when the detected fingerprint sensor temperature is within a predetermined temperature range, the controller controls the power source to be off; when the detected fingerprint sensor temperature is higher than the highest temperature of the predetermined temperature range, the controller controls the power source to supply a reverse bias current to the thermoelectric semiconductor assembly; and when the detected fingerprint sensor temperature is lower than the lowest temperature of the predetermined temperature range, the controller controls the power source to supply a forward bias current to the thermoelectric semiconductor assembly.

Preferably, the predetermined temperature range is from 25° C. to 37° C.

In yet another embodiment, the apparatus for controlling the fingerprint sensor temperature further comprises a door-unlock sensor such that the controller connects the power source to the thermoelectric semiconductor assembly if a door unlock signal is detected by the door unlock sensor.

An exemplary method for controlling fingerprint sensor temperature comprises detecting temperature at a fingerprint sensor temperature, determining if the detected fingerprint sensor temperature is within a predetermined temperature range, cutting off the power source to the thermoelectric semiconductor assembly if the detected fingerprint sensor temperature is within the predetermined temperature range, applying a reverse bias current from the power source if the detected fingerprint sensor temperature is higher than the highest temperature of the predetermined temperature range, and applying a forward bias current to the thermoelectric semiconductor assembly from the power source if the detected fingerprint sensor temperature is lower than the lowest temperature of the predetermined temperature range.

In a further embodiment, the method for controlling fingerprint sensor temperature further comprises detecting a door unlock signal before detecting the fingerprint sensor temperature, wherein the thermoelectric semiconductor assembly is connected to the power source if a door unlock signal is detected.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
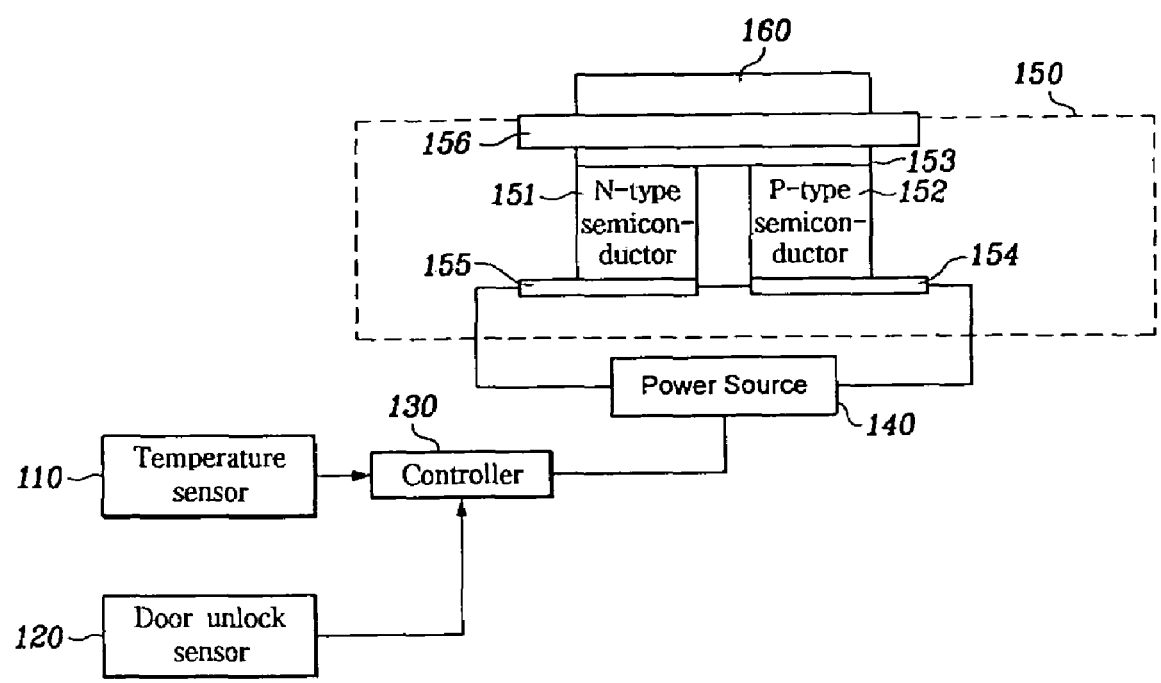
FIG. 1 is a block diagram of an apparatus for controlling a fingerprint sensor temperature according to an embodiment of this invention.

As shown in FIG. 1, the apparatus for controlling the fingerprint sensor temperature according to a preferred embodiment of the present invention includes a temperature sensor 110 for detecting fingerprint sensor temperature, a door unlock sensor 120 for detecting a door unlock signal originating from the ignition key or a remote controller, a thermoelectric semiconductor assembly 150, a power source 140 (preferably a DC source) supplying current to the thermoelectric semiconductor assembly 150, and a controller 130 for controlling the power source 140 based on the fingerprint sensor temperature from the temperature sensor 110 and the door unlock signal from the door unlock sensor 120.

The thermoelectric semiconductor assembly 150 is interposed between the fingerprint sensor 160 and the power source 140, and it has an intermediate element 156 having contact with the fingerprint sensor 160 such that heat transfer to the fingerprint sensor 160 can be realized. The power source 140 is electrically connected to the thermoelectric semiconductor assembly 150, which is supplied with a forward bias current or a reverse bias current from the power source 140. The controller 130 receives a fingerprint sensor temperature signal from the temperature sensor 110, and a door unlock signal from the door unlock sensor 120 so as to determine on/off of the power source 140 and the direction of the current from the power source 140.

The thermoelectric semiconductor assembly 150 has an n-type semiconductor 151, a p-type semiconductor 152, an electrode 153 for conjunction between the n-type semiconductor and the p-type semiconductor, and two counter electrodes 154, 155 respectively connected to the p-type semiconductor 152 and the n-type semiconductor 151. The two counter electrodes 154, 155 are connected to the power source 140 in series. The conjunction electrode 153 and the counter electrodes 154, 155 are formed as conductors. Furthermore, the intermediate element 156 is formed as a non-conductor, preferably of silicon.

Figure 2:
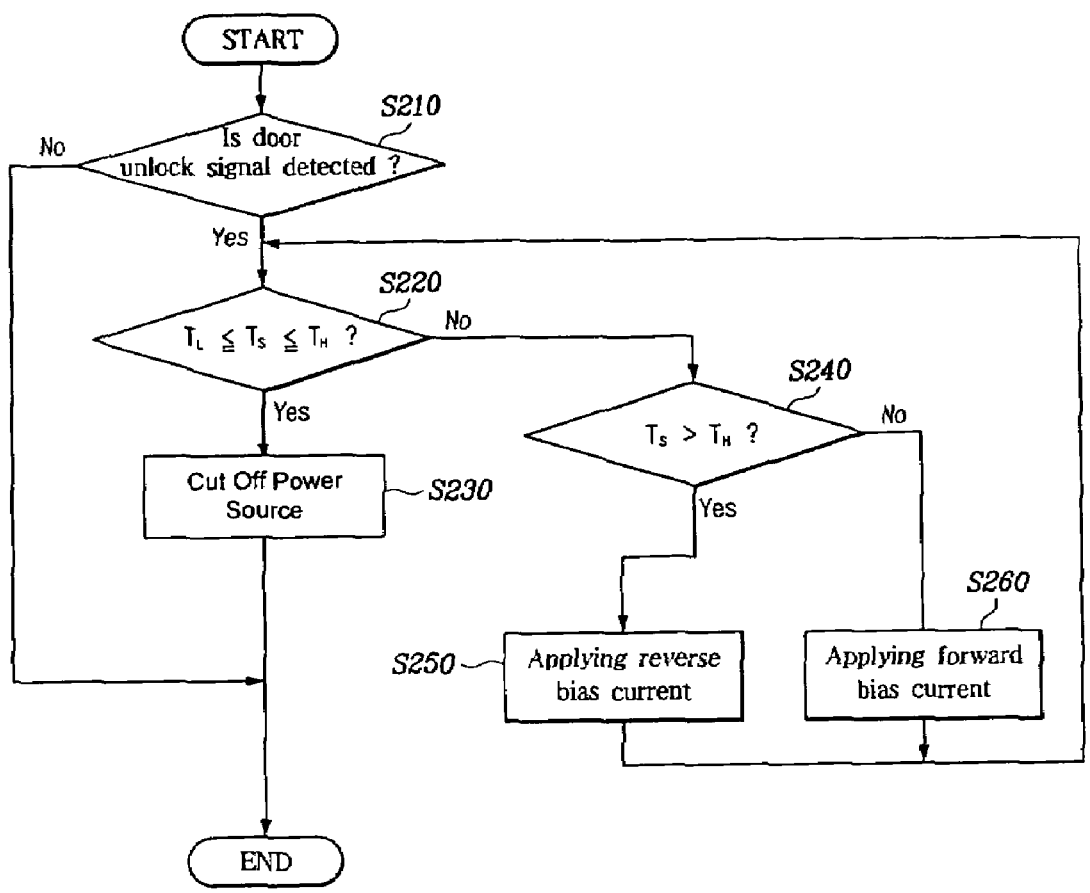
FIG. 2 is a flow chart showing a method for controlling a fingerprint sensor temperature according to an embodiment of this invention.

As shown in FIG. 2, the door unlock sensor 120 detects the door unlock signal and transmits it to the controller 130 at step S210, and the temperature sensor 110 detects the fingerprint sensor temperature and also transmits it to the controller 130. The term "$T_s$" refers to "detected fingerprint sensor temperature," the term "$T_H$" refers to "highest temperature of the predetermined temperature range" and the "$T_L$" refers to "lowest temperature of the predetermined temperature range."

The controller 130 determines whether $T_s$ is within a predetermined temperature range at step S220, the predetermined temperature range being set for fingerprint recognition with stability and reliability. Preferably, the predetermined temperature range is from 25° C. to 37° C.

In the case that the $T_s$ is within the predetermined fingerprint sensor temperature range, the controller 130 cuts off the current supplied from the power source 140 to the thermoelectric semiconductor assembly 150, and in the case that the $T_s$ is not within the predetermined temperature range, the controller 130 determines if the $T_s$ is higher than the $T_H$ at step S240.

In the case that the $T_s$ is higher than the $T_H$ when the $T_s$ is not within the predetermined temperature range, the controller 130 controls the power source 140 such that a reverse bias current is applied to the thermoelectric semiconductor assembly 150 at step S250.

If the reverse bias current is applied to the thermoelectric semiconductor assembly 150, electrons of the n-type semiconductor 151 and holes of the p-type semiconductor 152 move to the counter electrodes 154, 155 such that the conjunction electrode 153 is cooled by the Peltier effect. Accordingly, heat transfer from the fingerprint sensor 160 to the conjunction electrode 153 occurs such that the $T_s$ is decreased.

However, in the case that the $T_s$ is not higher than the $T_H$ when the $T_s$ is not within the predetermined temperature range, the controller 130 controls the power source 140 such that a forward bias current is applied to the thermoelectric semiconductor assembly 150 at step S260.

If the forward bias current is applied to the thermoelectric semiconductor assembly 150, electrons of the n-type semiconductor 151 and holes of the p-type semiconductor 152 move to the conjunction electrode 153 such that the conjunction electrode 153 is heated. Accordingly, heat transfer from the conjunction electrode 153 to the fingerprint sensor 160 occurs such that the $T_s$ is increased.

According to the apparatus and the method for controlling the fingerprint sensor temperature, the fingerprint sensor temperature is maintained within a predetermined temperature range such that the fingerprint sensor can be provided to the vehicle with stability and reliability regardless of driving conditions.

What is claimed is:

1. An apparatus for controlling a fingerprint sensor temperature, comprising:
   a power source;
   a temperature sensor for detecting the fingerprint sensor temperature;
   a semiconductor assembly interposed between the fingerprint sensor and the power source for cooling or heating the fingerprint sensor according to a direction of a current from the power source; and
   a controller controlling the power source based on the fingerprint sensor temperature,
   wherein the semiconductor assembly comprises an n-type semiconductor, a p-type semiconductor, an electrode for conjunction between the n-type semiconductor and the p-type semiconductor, two counter electrodes respectively connected to the power source in series, and an intermediate element for heat transfer between the electrode and the fingerprint sensor.

2. The apparatus of claim 1, wherein the power source comprises a DC source.

3. The apparatus of claim 1, wherein the intermediate element is formed with silicon.

4. The apparatus of claim 1, wherein:
   in the case that the detected fingerprint sensor temperature is within a predetermined temperature range, the controller controls the power source to be off;
   in the case that the detected fingerprint sensor temperature is higher than a highest temperature of the predetermined temperature range, the controller controls the power source to supply a reverse bias current to the semiconductor assembly; and
   in the case that the detected fingerprint sensor temperature is lower than a lowest temperature of the predetermined temperature range, the controller controls the power source to supply a forward bias current to the semiconductor assembly.

5. The apparatus of claim 4, wherein the predetermined temperature range includes 25° C. to 37° C.

6. The apparatus of claim 1, further comprising a door unlock sensor, wherein the controller connects the power source to the semiconductor assembly only if a door unlock signal is detected by the door unlock sensor.

7. A method for controlling a fingerprint sensor temperature, utilizing a thermoelectric semiconductor assembly connected to a power source, comprising:
   detecting the fingerprint sensor temperature, determining whether the detected fingerprint sensor temperature is within a predetermined temperature range;
   cutting off the power source to the semiconductor assembly if the detected fingerprint sensor temperature is within the predetermined temperature range;
   applying a reverse bias current to the semiconductor assembly from the power source if the detected fingerprint sensor temperature is higher than the highest temperature of the predetermined temperature range; and applying a forward bias current to the semiconductor assembly from the power source if the detected fingerprint sensor temperature is lower than the lowest temperature of the predetermined temperature range.

8. The method of claim 7, further comprising detecting a door unlock signal before detecting the fingerprint sensor temperature, wherein the semiconductor assembly is connected to the power source if the door unlock signal is detected.

9. The method of claim 7, wherein the power source is a DC source.

10. The method of claim 7, wherein the semiconductor assembly is a thermoelectric semiconductor assembly.

11. An apparatus for controlling temperature of a fingerprint sensor, comprising:
a power source;
a temperature sensor configured to sense temperature at the fingerprint sensor;
a semiconductor assembly configured and dimensioned to be disposed between the fingerprint sensor and said power source;
a controller communicating with said power source and receiving signals from said temperature sensor, said controller being programmed to turn off the power source when the sensed temperature is within a predetermined range, supply a reverse bias current from the power source to the semiconductor assembly when the sensed temperature is higher than the predetermined range; and supply a forward bias current from the power source to the semiconductor assembly when the sensed temperature is lower than the predetermined range.

12. The apparatus of claim 11, wherein said semiconductor assembly comprises a thermoelectric semiconductor assembly and the power source is a DC power source.

13. The apparatus of claim 11, wherein said semiconductor assembly comprises:
an n-type semiconductor;
a p-type semiconductor;
an electrode extending between said semiconductors;
an intermediate element formed on said electrode and configured for contact with the fingerprint sensor; and
a counter electrode connected between each semiconductor and the power source.

14. The apparatus of claim 13, wherein said intermediate layer is a silicon layer for facilitating heat transfer.

* * * * *